3,025,259
COMPOSITION COMPRISING RUBBER AND CHEMICALLY MODIFIED CARBON BLACK, AND METHOD FOR PREPARING SAME
John William Watson, Sutton Coldfield, Charles Edwin Kendall, Castle Bromwich, Birmingham, and Roy Jervis, Newcastle, England, assignors to Dunlop Rubber Company Limited, London, England, a British company
No Drawing. Filed July 13, 1959, Ser. No. 826,401
Claims priority, application Great Britain July 22, 1958
18 Claims. (Cl. 260—41.5)

This invention relates to novel rubber compositions and to articles made therefrom.

It is well known that the physical properties of a cured natural or synthetic rubber composition will be improved if carbon black is mixed with the rubber composition prior to curing. However it would be advantageous if these physical properties could be improved further.

It is an object of this invention to provide cured rubber compositions reinforced with carbon black which have improved physical properties.

According to the present invention therefore a cured rubber composition comprises in admixture natural or synthetic rubber and carbon black having hydrocarbon groups chemically attached to the surface of the particles thereof. Hydrocarbon groups are by definition chemical groups containing only carbon and hydrogen.

In our co-pending application Serial No. 826,447, filed July 13, 1959, we have described and claimed carbon blacks having hydrocarbon groups chemically attached to the surface of the particles thereof and to method of preparing such blacks. These blacks are referred to as modified carbon blacks. The hydrocarbon groups which may be attached to the surface of the modified carbon blacks may be aliphatic or aromatic groups such as alkyl, alkenyl, aralkyl and aryl groups. Examples of such groups are methyl, ethyl, propyl, isopropyl, allyl, butyl, phenyl, benzyl and ethylphenyl groups. For the purpose of this specification modified carbon blacks containing alkyl, alkenyl or aralkyl groups will be referred to as alkylated carbon blacks and modified carbon blacks containing aryl groups will be referred to as arylated carbon blacks.

The modified carbon blacks may be of two types, (1) the fully alkylated or arylated blacks and (2) the partially alkylated or arylated carbon blacks. A fully alkylated or arylated carbon black is one in which all of the reactive sites which are present on the surface of the unmodified black have been occupied by alkyl, alkenyl, aralkyl or aryl groups and a partially alkylated or arylated carbon black is one in which only a proportion of the reactive sites are occupied by such groups.

Modified carbon blacks which may be used in the present invention are the modified furnace blacks, thermal blacks and channel blacks. Examples of these modified blacks are the modified super abrasion furnace blacks, modified high abrasion furnace blacks, modified fast extrusion furnace blacks, modified fine furnace blacks, modified medium processing channel blacks, modified hard processing channel blacks and modified conducting channel blacks. Other blacks such as modified acetylene blacks and various modified graphitized blacks may be used.

The modified carbon blacks may be prepared by reacting commercial carbon black with an alkylating agent in the presence of a Friedel-Crafts type reaction catalyst. An arylated carbon black may be prepared by reacting a halogenated black with an aromatic hydrocarbon in the presence of a Friedel-Crafts type reaction catalyst.

The modified carbon blacks have been found to be particularly useful for incorporation in natural or synthetic rubber. Typical synthetic rubbers include polyisoprenes, polychloroprenes, polyolefines, polybutadiene, copolymers of butadiene with syrene, copolymer of butadiene with acrylonitrile, copolymer of butadiene with methylisopropenyl ketone, copolymers of isobutylene with diolefines, such as Butyl rubber and polyurethanes.

The carbon black may be incorporated in natural or synthetic rubbers by normal means, for example by milling, and it has been found that the presence of the modified carbon black improves the physical properties of rubber compositions as compared with unmodified carbon blacks. Preferably the rubber compositions in accordance with the present invention are cured by heating them in the presence of a curing agent such as a sulphur or a free-radical curing agent having the general formula

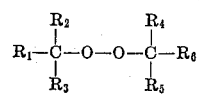

in which $R_1$ and $R_6$ represent aryl groups, $R_2$, $R_3$, $R_4$ and $R_5$ represent hydrogen or alkyl groups containing less than 4 carbon atoms. The preferred compositions are those which have been cured in the presence of dicumyl peroxide.

The amount of free-radical curing agent which is used depends somewhat on the nature of the rubber composition to be cured. The amount may vary between 1 and 5 parts of free-radical curing agent per 100 parts of natural or synthetic rubber but it is preferred to use between 1.25 parts and 2.75 parts of free-radical curing agent.

The rubber compositions containing the modified carbon black are usually cured at a temperature between 110° C. and 170° C. until the resilience or other desired physical property is at an optimum.

Rubber compositions having particularly advantageous physical properties are obtained when a modified carbon black which is partially alkylated or arylated is admixed with natural or synthetic rubber. It is preferred to use a carbon black which is alkylated to between 10 percent and 80 percent of full alkylation but carbon blacks which are alkylated to between 15 and 40 percent are particularly useful.

The amount of modified carbon black which is admixed with the natural or synthetic rubber may vary over wide limits. If a hard rubber composition is required then a large amount of carbon black is usually used, but however if a soft rubber composition is required then much less carbon black will be necessary. For most purposes it is preferred to incorporate between ten and one hundred parts by weight of modified carbon black in one hundred parts of rubber. A rubber composition suitable for use as tyre treads which contains fifty parts by weight of carbon black per one hundred parts of rubber has been found to have particularly good physical properties.

In carrying out the invention the natural or synthetic rubber may be milled with the modified carbon black and curing agent in the usual manner and the composition so obtained shaped in a mould and cured. The rubber compositions in accordance with this invention can be used to manufacture tyres, belting, hose, shoe soles and other articles. Cured rubber compositions formed in this way have an increased resistance to abrasion and tear as compared with compositions containing an unmodified carbon black. For example, increases in the resistance to abrasion and in tear strength of up to 83 percent and 75 percent respectively have been observed. The tensile strengths of rubber compositions containing the modified carbon black have been increased by up to 112 percent as compared with rubber compositions containing unmodified carbon black.

The following examples illustrate the invention.

Example I

This example illustrates the use of a fully methylated high abrasion furnace carbon black to reinforce natural rubber.

The black used was a fully methylated black prepared from an unmodified high abrasion furnace black (H.A.F. black) which has a specific surface area of 80 square metres per gramme, available under the trade name Philblack O. These blacks had the following percentage compositions by weight:

|  | Carbon | Hydrogen |
|---|---|---|
| Unmodified black | 97.70 | 0.20 |
| Fully methylated black | 97.14 | 0.35 |

Fifty grammes of the fully methylated carbon black were milled with 100 grammes of natural rubber and 2.5 grammes of dicumyl peroxide. The rubber composition so obtained was cured by heating it at a temperature of 148° C. for 100 minutes.

A similar cured sample was prepared containing fifty grammes of unmodified carbon black instead of the fully methylated carbon black. This sample was used as a control.

The physical properties of the two samples were evaluated and the results are tabulated below.

|  | Sample containing fully methylated carbon black | Control |
|---|---|---|
| Abrasion resistance | 115 | 100 |
| Tear resistance (lb. per in.) | 222 | 183 |

Example II

This example illustrates the use of a fully ethylated H.A.F. carbon black to reinforce natural rubber.

The black used was a fully ethylated black prepared from the unmodified H.A.F. black described in Example I. These blacks had the following percentage compositions by weight:

|  | Carbon | Hydrogen |
|---|---|---|
| Unmodified black | 97.6 | 0.31 |
| Fully ethylated black | 96.72 | 0.94 |

Fifty grammes of the fully ethylated black were milled with 100 grammes of natural rubber and 2.25 grammes of dicumyl peroxide. The rubber composition so obtained was cured by heating it to a temperature of 148° C. for 100 minutes.

A similar cured sample of rubber composition was prepared but containing unmodified carbon black of the type described. This sample was used as a control.

The physical properties of the two compositions were evaluated and the results are tabulated below.

|  | Sample containing fully ethylated carbon black | Control |
|---|---|---|
| Abrasion resistance | 113 | 100 |
| Tear resistance (lb. per in.) | 281 | 196 |
| Tensile strength (lb. per sq. in.) | 2,940 | 2,460 |

This example shows that the physical properties of the cured rubber composition containing ethylated carbon black were improved over those of the composition containing unmodified black.

Example III

This example illustrates the use of a fully butylated carbon black to reinforce natural rubber.

The black used was a fully butylated black prepared from the unmodified H.A.F. black described in Example I. These blacks had the following percentage compositions by weight:

|  | Carbon | Hydrogen |
|---|---|---|
| Unmodified black | 97.54 | 0.23 |
| Fully butylated black | 96.05 | 0.93 |

Fifty grammes of the fully butylated carbon black were milled with 100 grammes of natural rubber and 2.25 grammes of dicumyl peroxide. The rubber composition so obtained was cured by heating it to a temperature of 148° C. for 100 minutes.

A similar cured sample of rubber composition, was prepared but containing the unmodified carbon black and this sample was used as a control.

The physical properties of the two compositions were evaluated and the results are tabulated below:

|  | Sample containing butylated carbon black | Control |
|---|---|---|
| Abrasion resistance | 100 | 100 |
| Tear resistance (lb. per in.) | 387 | 244 |
| Tensile strength (lb. per sq. in.) | 2,740 | 1,890 |

Although the abrasion resistance did not increase the tear resistance and tensile strength increased considerably.

Example IV

This example illustrates the use of a carbon black having dimethylene groups on the surface thereof to reinforce synthetic and natural rubber respectively.

The black used was a black containing dimethylene groups on the surface prepared from the unmodified H.A.F. black described in Example I. These blacks had the following percentage compositions by weight:

|  | Carbon | Hydrogen | Chlorine |
|---|---|---|---|
| Unmodified black | 97.54 | 0.23 | 0 |
| Black having dimethylene groups on the surface | 97.07 | 0.60 | 0.08 |

Fifty grammes of the H.A.F. carbon black with dimethylene groups on the surface were milled in to 100 grammes of a synthetic rubber which is a copolymer of 75 percent by weight of butadiene and 25 percent of styrene, available under the name Krylene, and 1.75 grammes of dicumyl peroxide. The rubber composition so obtained was cured by heating it to a temperature of 148° C. for 100 minutes.

A similar cured sample was prepared but containing the unmodified carbon black and this sample was used as a control.

The physical properties of the two compositions were evaluated and the results are tabulated below:

|  | Sample containing black having dimethylene groups on the surface | Control |
|---|---|---|
| Abrasion resistance | 150 | 100 |
| Tear resistance (lb. per in.) | 253 | 145 |
| Tensile strength (lb. per sq. in.) | 2,310 | 1,090 |

The physical properties of the synthetic rubber composition were obviously considerably improved when the modified carbon black was used.

Similar cured rubber compositions were prepared using natural rubber in place of the synthetic rubber described above, but the amount of dicumyl peroxide was increased to 2.5 grammes.

The samples had the following physical properties:

|  | Sample containing black having dimethylene groups on the surface | Control |
|---|---|---|
| Abrasion resistance | 92 | 100 |
| Tear resistance (lb. per in.) | 259 | 226 |
| Tensile strength (lb. per sq. in.) | 2,420 | 1,260 |

*Example V*

This example illustrates the use of partially ethylated carbon black to reinforce synthetic rubber.

The black used was a partially ethylated black prepared from the unmodified H.A.F. black described in Example I. These blacks had the following percentage compositions by weight:

|  | Carbon | Hydrogen |
|---|---|---|
| Unmodified black | 97.54 | 0.23 |
| Partially ethylated black | 96.42 | 0.46 |

The partially ethylated black contained 0.23 percent by weight of hydrogen in excess of the unmodified black and the fully ethylated black described in Example II contained 0.63 percent by weight of hydrogen in excess of the unmodified black described in that example. Thus the partially ethylated black was ethylated to 37 percent of the maximum possible.

Fifty grammes of the partially ethylated carbon black were milled into 100 grammes of the synthetic rubber described in Example IV and 1.75 grammes of dicumyl peroxide. The rubber composition obtained was cured at 148° C. for 100 minutes.

A similar cured sample was prepared using the unmodified carbon black described above. This sample was used as a control.

The physical properties of the two compositions were evaluated and the results are tabulated below.

|  | Sample containing modified carbon black | Control |
|---|---|---|
| Abrasion resistance | 146 | 100 |
| Tear resistance (lb. per in.) | 244 | 176 |
| Tensile strength (lb. per sq. in) | 2,160 | 1,390 |

*Example VI*

This example illustrates the use of a partially ethylated carbon black to reinforce rubber compositions. The black used was a partially ethylated black prepared from the unmodified H.A.F. black described in Example I. These blacks had the following percentage compositions by weight:

|  | Carbon | Hydrogen |
|---|---|---|
| Unmodified black | 97.54 | 0.23 |
| Partially ethylated black | 97.23 | 0.34 |

The partially ethylated carbon black contained 0.11 percent by weight of hydrogen in excess of the unmodified black and the fully ethylated black described in Example II contained 0.63 percent by weight of hydrogen in excess of the unmodified black described in that example. Thus the partially ethylated black was ethylated to 17 percent of the maximum possible.

Two cured samples of rubber composition similar to those described in Example V were prepared using the synthetic rubber described in Example IV and the 17 percent fully ethylated carbon black in place of the 37 percent fully ethylated black.

The physical properties of the two cured rubber compositions were evaluated and the results are tabulated below.

|  | Sample containing modified carbon black | Control |
|---|---|---|
| Abrasion resistance | 182 | 100 |
| Tear resistance (lb. per in.) | 272 | 176 |
| Tensile strengrh (lb. per sq. in.) | 2,560 | 1,390 |

Having now described our invention, what we claim is:

1. A cured rubber composition comprising, in admixture, a rubber and carbon black having hydrocarbon groups chemically attached to the surface of the carbon black, at least one carbon atom of each hydrocarbon group being bonded directly to a carbon atom forming part of the surface of the black.

2. A cured rubber composition according to claim 1 in which the carbon black is fully alkylated.

3. A cured rubber composition according to claim 1 in which the carbon black is partially alkylated.

4. A cured rubber composition according to claim 3 in which the carbon black is alkylated to between 10 percent and 80 percent of full alkylation.

5. A cured rubber composition according to claim 4 in which the carbon black is alkylated to between 15 percent and 40 percent of full alkylation.

6. A cured rubber composition according to claim 1 in which the rubber is a copolymer of butadiene and styrene.

7. A cured rubber composition according to claim 1 in which the hydrocarbon groups are selected from the class consisting of alkyl, alkenyl, aralkyl and aryl groups.

8. A cured rubber composition according to claim 1 in which the carbon black is fully arylated.

9. A cured rubber composition according to claim 1 in which the carbon black is partially arylated.

10. A method for the production of a cured rubber composition which comprises incorporating in rubber carbon black having hydrocarbon groups chemically attached to the surface of the carbon black, at least one carbon atom of each hydrocarbon group being bonded directly to a carbon atom forming the surface of the carbon black and a curing agent in an amount from one part to five parts per 100 parts of rubber selected from the class consisting of sulphur and free-radical curing agents having the general formula

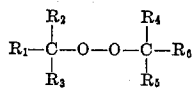

in which $R_1$ and $R_6$ represent aryl groups, $R_2$, $R_3$, $R_4$ and $R_5$ represent hydrogen or alkyl groups containing less than four carbon atoms, and heating the resultant mixture at a temperature of 110° C. to 170° C.

11. A method for the production of a cured rubber composition which comprises incorporating in rubber carbon black which is fully alkylated and having carbon groups chemically attached to the surface of the carbon black, at least one carbon atom of each hydrocarbon group being bonded directly to a carbon atom forming the surface of the carbon black and a curing agent comprising dicumyl peroxide in an amount of one part to five parts per 100 parts of rubber, and heating the resultant mixture at a temperature of 110° C. to 170° C.

12. A method for the production of a cured rubber composition which comprises incorporating in rubber carbon black which is partially alkylated and having carbon groups chemically attached to the surface of the carbon black, at least one carbon atom of each hydrocarbon group being bonded directly to a carbon atom forming the surface of the carbon black and a curing agent comprising dicumyl peroxide in an amount of one part to five parts per 100 parts of rubber, and heating the resultant mixture at a temperature of 110° C. to 170° C.

13. A method for the production of a cured rubber composition which comprises incorporating in a rubber composition carbon black which is alkylated to between 10% and 80% of full alkylation and having carbon groups chemically attached to the surface of the carbon black, at least one carbon atom of each hydrocarbon group being bonded directly to a carbon atom forming the surface of the carbon black and a curing agent comprising dicumyl peroxide in an amount of 1 part to 5 parts per 100 parts of rubber and heating the resulting mixture at a temperature of 110° C. to 170° C.

14. A method for the production of a cured rubber composition which comprises incorporating in rubber carbon black which is fully alkylated and having carbon groups chemically attached to the surface of the carbon black, at least one carbon atom of each hydrocarbon group being bonded directly to a carbon atom forming the surface of the carbon black and a curing agent comprising sulphur in an amount of one part to five parts per 100 parts of rubber and heating the resultant mixture at a temperature of 110° C. to 170° C.

15. A method for the production of a cured rubber composition which comprises incorporating in rubber carbon black which is partially alkylated and having carbon groups chemically attached to the surface of the carbon black, at least one carbon atom of each hydrocarbon group being bonded directly to a carbon atom forming the surface of the carbon black and a curing agent comprising sulphur in an amount of one part to five parts per 100 parts of rubber and heating the resultant mixture at a temperature of 110° C. to 170° C.

16. A method for the production of a cured rubber composition which comprises incorporating in a rubber composition carbon black which is alkylated to between 10% and 80% of full alkylation and having carbon groups chemically attached to the surface of the carbon black, at least one carbon atom of each hydrocarbon group being bonded directly to a carbon atom forming the surface of the carbon black and a curing agent comprising sulphur in an amount of 1 part to 5 parts per 100 parts of rubber and heating the resultant mixture at a temperature of 110° C. to 170° C.

17. A method according to claim 10 in which the amount of free-radical curing agent is from 1.25 parts to 2.75 parts by weight per hundred parts by weight of rubber.

18. A method according to claim 10 in which the free-radical curing agent is dicumyl peroxide.

References Cited in the file of this patent
UNITED STATES PATENTS

| | | |
|---|---|---|
| 2,751,369 | Te Grotenhuis | June 19, 1956 |
| 2,780,612 | Te Grotenhius | Feb. 5, 1957 |
| 2,909,584 | Parks | Oct. 20, 1959 |